(12) United States Patent
Zhang

(10) Patent No.: US 12,113,804 B2
(45) Date of Patent: Oct. 8, 2024

(54) METHOD FOR AUTHORIZED USE OF PROJECTOR

(71) Applicant: APPOTRONICS CORPORATION LIMITED, Guangdong (CN)

(72) Inventor: Biqiong Zhang, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 588 days.

(21) Appl. No.: 17/310,888

(22) PCT Filed: Feb. 26, 2020

(86) PCT No.: PCT/CN2020/076724
§ 371 (c)(1),
(2) Date: Aug. 27, 2021

(87) PCT Pub. No.: WO2020/173455
PCT Pub. Date: Sep. 3, 2020

(65) Prior Publication Data
US 2022/0150261 A1 May 12, 2022

(30) Foreign Application Priority Data
Feb. 27, 2019 (CN) .......................... 201910143892.3

(51) Int. Cl.
*H04L 9/40* (2022.01)
*G06K 7/14* (2006.01)
*G06K 19/06* (2006.01)

(52) U.S. Cl.
CPC .......... *H04L 63/123* (2013.01); *G06K 7/1417* (2013.01); *G06K 19/06037* (2013.01); *H04L 63/0442* (2013.01); *H04L 63/045* (2013.01)

(58) Field of Classification Search
CPC . H04L 63/123; H04L 63/0442; H04L 63/045; G06K 7/1417; G06K 19/06037;
(Continued)

(56) References Cited

U.S. PATENT DOCUMENTS

| 10,659,220 | B2 * | 5/2020 | Jiang ........................ G09C 5/00 |
| 2012/0095791 | A1 | 4/2012 | Stefik et al. |
| 2015/0341333 | A1 * | 11/2015 | Feng ..................... H04L 9/3297 |
| | | | 713/168 |

FOREIGN PATENT DOCUMENTS

| CN | 106530454 A | 3/2017 |
| CN | 108305147 A | 7/2018 |
| CN | 108932424 A | 12/2018 |

OTHER PUBLICATIONS

ISA China National Intellectual Property Administration, International Search Report Issued in Application No. PCT/CN2020/076724, May 27, 2020, WIPO, 6 pages.

* cited by examiner

*Primary Examiner* — Baotran N To
(74) *Attorney, Agent, or Firm* — McCoy Russell LLP

(57) ABSTRACT

A method for authorized use of a projector, comprising the following steps: a projector encodes a license into a QR code and displays same by means of projection; a mobile terminal identifies the QR code to obtain the license and transmits the license and a local terminal identifier of the mobile terminal to a projector authorization server; the projector authorization service verifies the local terminal identifier and the license and generates verification information if the verification is successful, and transmits the verification information to the mobile terminal; the mobile terminal receives and displays the verification information; the projector receives the input verification information, locally verifies the verification information, and if the local verification is successful, obtains use authorization corresponding to authorization information.

16 Claims, 5 Drawing Sheets

The projector obtains a license that is stored and includes authority information, encodes the license into a two-dimensional code, and displays the same by means of projection — S11

The projector receives verification information that is inputted, performs local verification on the verification information, and obtains use authority corresponding to the authority information in response to the local verification being successful — S12

(58) Field of Classification Search
CPC .......... G06F 21/33; G06F 21/44; G06F 21/60; G06F 21/602; G06Q 30/06; G06Q 30/0645

See application file for complete search history.

METHOD FOR AUTHORIZED USE OF PROJECTOR

CROSS REFERENCE TO RELATED APPLICATIONS

The present application is a U.S. National Phase of International Application No. PCT/CN2020/076724 entitled "METHOD FOR AUTHORIZED USE OF PROJECTOR," and filed on Feb. 26, 2020. International Application No. PCT/CN2020/076724 claims priority to Chinese Patent Application No. 201910143892.3 filed on Feb. 27, 2019. The entire contents of each of the above-listed applications are hereby incorporated by reference for all purposes.

TECHNICAL FIELD

The present disclosure relates to the field of detection technologies, and in particular, to a method for authorized use of a projector for lease.

BACKGROUND

With the thriving development of office and entrepreneurship, sharing economy has been increasingly affecting development of office commerce, and thus projector lease grows increasingly. In a projector lease business model, the management of lease authorization, especially the management of authorized time, is an important aspect of lease management.

Currently, most commercial projectors do not have Internet access, and common lease authorization schemes are pre-configured by personnel in the projectors.

However, in such a method for authorized use of a projector, offline authorization management is relatively difficult, and authorized objects and authorized time cannot be adjusted online.

Therefore, there is indeed a need to provide a new method for authorized use of a projector to solve the above technical problems.

SUMMARY

An objective of the present disclosure is to provide a method for authorized use of a projector that realizes online verification of a license and authorization information management and high security in a case that the projector is not connected to the Internet.

In order to achieve the above objective, the present disclosure provides a method for authorized use of a projector, the method including:

obtaining a license including authorization information stored on the projector;

encoding the license into a QR code and displaying the QR code by means of projection, wherein the QR code is scanned and identified by a mobile terminal, the mobile terminal is configured to identify the QR code to obtain the license, transmit the license and a local terminal identifier of the mobile terminal to a projector authorization server, and receive verification information generated by the projector authorization server in response to verification by the projector authorization server on the license and the local terminal identifier being successful; and receiving the verification information that is inputted, performing local verification on the verification information, and obtaining use authorization corresponding to the authorization information in response to the local verification being successful.

The present disclosure further provides a method for authorized use of a projector, the method including:

scanning a QR code that is displayed by the projector by means of projection, decoding the QR code to obtain a corresponding license, and extracting an address of a projector authorization server from the license;

obtaining a local terminal identifier, and transmitting the local terminal identifier and the license to the projector authorization server corresponding to the address of the projector authorization server, wherein the projector authorization server performs verification on the license, and the license includes authorization information and the address of the projector authorization server; and receiving verification information that is generated by the projector authorization server in response to verification by the projector authorization server on the local terminal identifier and the license being successful, wherein the verification information is inputted to the projector, and the projector performs local verification on the verification information and obtains use authorization corresponding to the authorization information in response to the local verification being successful.

BRIEF DESCRIPTION OF DRAWINGS

The present disclosure is described in detail below with reference to the accompanying drawings. The above and other aspects of the present disclosure will be made clearer and more easily understood through a detailed description with reference to the following accompanying drawings. In the drawings.

DESCRIPTION OF EMBODIMENTS

Specific implementations of the present disclosure are described in detail below with reference to the accompanying drawings.

The implementations/embodiments described herein are specific embodiments of the present disclosure, and are provided only to explain the concept of the present disclosure. All these embodiments are explanatory and exemplary, and shall not be interpreted as constituting any limitation on the implementations and the scope of the present disclosure. In addition to the embodiments described herein, those skilled in the art may also adopt other obvious technical solutions on the basis of the disclosure in the claims and the specification of the present disclosure. These technical solutions include those obtained by making obvious substitutions and modifications to the embodiments described herein, all of which shall fall within the scope of the present disclosure.

Figure 1:
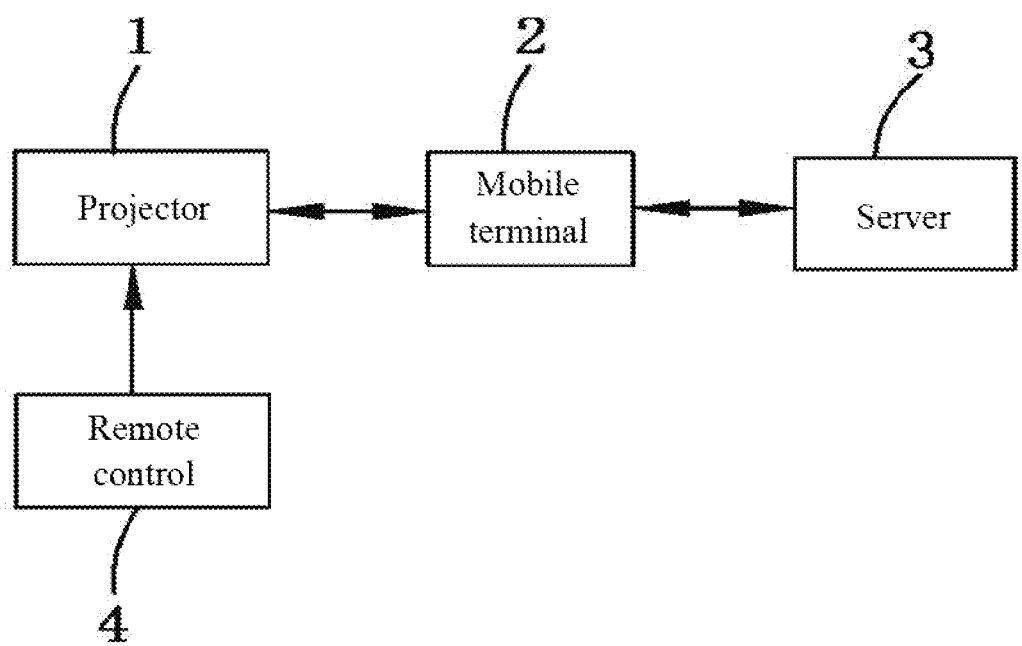
FIG. 1 is a schematic diagram of a hardware structure used by a method for authorized use of a projector according to the present disclosure.

Referring to FIG. 1, the hardware involved in a method for authorized use of a projector according to the present disclosure includes a projector 1, a mobile terminal 2 and a projector authorization server 3. The projector 1 includes a self-contained remote control 4. Certainly, the projector 1 may not include the remote control 4.

A lessor provides the projector 1 and the projector authorization server 3, and leases the projector 1 to a lease user. The lease user provides the mobile terminal 2.

The projector 1 stores a license. When the license is leased to the lease user by the lessor, a management document of use time is authorized in management lease set up by the projector 1. The license includes authorization information. The authorization information includes at least one of authorized use duration, a lease use time period, or geographic location information. The license further includes a projector identifier. The projector identifier is a digital serial number of the projector 1, and is configured to confirm identity of the projector 1 and facilitate the use of lease management.

The mobile terminal 2 is a smart phone or a tablet computer. Prior to lease, the lease user provides one or more contact numbers to the lessor, and the lessor identifies the one or more contact numbers within an authorization range and stores the one or more contact numbers into the projector authorization server 3 for authorization verification to facilitate management; that is, only an actual lease user is allowed to use the projector 1.

The projector authorization server 3 is configured to perform verification on a lease license. The projector authorization server 3 performs data communication with the mobile terminal 2. Specifically, a Bluetooth or 3G or 4G or 5G or 2.4G or zigBee or TCP/IP or NFC or RCC or lora or NB-IOT communication protocol is used between the mobile terminal 2 and the projector authorization server 3.

The remote control 4 matches the projector 1. The remote control 4 and the projector 1 perform data communication with each other by infrared or Bluetooth. The remote control 4 may directly input and transmit a text to the projector 1 or use its functional key (direction key) to select text in the projector 1 for input. The remote control 4 functions to input verification information to the projector 1. The projector 1 performs automatic verification upon receipt of the verification information, and in response to the verification being successful, the projector 1 starts to operate normally.

Figure 2:
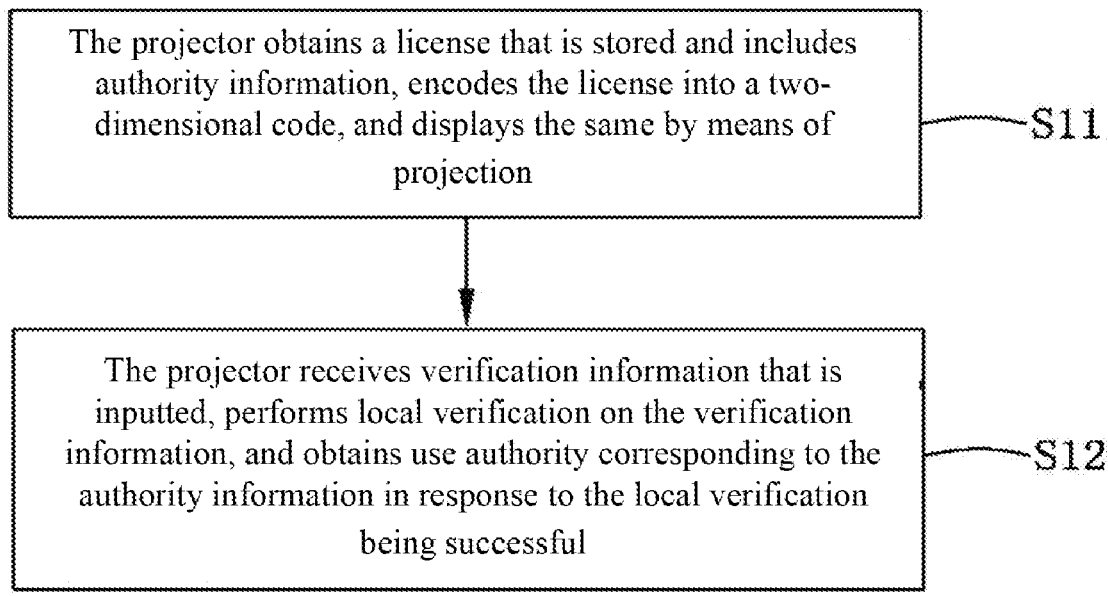
FIG. 2 is a flowchart diagram of a method for authorized use of a projector according to the present disclosure.

Referring to FIG. 2, the present disclosure provides a method for authorized use of a projector, based on a projector 1. The method for authorized use of a projector includes the following steps.

In step S11, the projector 1 obtains a license that is stored and includes authorization information, encodes the license into a two-dimensional code, and displays the same by means of projection, for scanning and identification by a mobile terminal 2. The mobile terminal 2 is configured to identify the two-dimensional code to obtain the license, transmit the license and a local terminal identifier of the mobile terminal 2 to a projector authorization server 3, and receive verification information generated by the projector authorization server 3 in response to verification on the local terminal identifier and the license being successful. In step 511, the projector 1 generates, in real time, a two-dimensional code from authorization information of the projector 1 in lease through the authorization information included in the license, and displays the same by means of projection. A two-dimensional code is also referred to as a two-dimensional bar code. A common two-dimensional code is a QR (Quick Response) code, which is a popular coding method on mobile devices in recent years, can store more information than a conventional Bar Code, and can also represent more data types. A two-dimensional bar code/two-dimensional code uses black and white graphics of a specific geometric figure distributed according to a certain rule in a plane (two-dimensional directions) to record data symbol information. The concept of "0" and "1" bitstreams, which constitute the basis of computer internal logic, is cleverly used in coding, a number of geometric shapes corresponding to binary are used to represent text numeric information, and automatic information processing can be achieved by automatic reading of an image input device or a photoelectric scanning device. It has some commonalities of barcode technologies: each code system has its specific character set; each character occupies a certain width; it has a certain verification function, and so on. At the same time, it also has a function of automatically identifying information in different rows, and it may process a change point of graph rotation.

The authorization information of the projector 1 includes at least one of authorized use duration, a lease use time period, or geographic location information. For example, different charging standards are adopted for different regions, and lengths of time, whether the current time is within a monthly period, geographical location, etc., these information can be used as reference factors for determining whether the user is authorized to use the authorization information of the projector. In this implementation, the authorization information of the projector 1 includes authorized use duration. That is, the projector 1 may update authorized time in the lease license according to usage, that is, update use time. For a specific application scenario of device lease, management of the authorized time is a key point, which enables the device lease to be accurate to specific use time, and it may not cost lease time if the device is placed in situ and not turned on. Therefore, the problem involving fine lease management in the lease process is solved, making it beneficial for the lessor to expand the lease market.

In step S12, the projector 1 receives verification information that is inputted, performs local verification on the verification information, and obtains use authorization corresponding to the authorization information in response to the local verification being successful.

In this implementation, the step of receiving, by the projector 1, verification information that is inputted includes: receiving the verification information that is inputted by a remote control 4. The verification information is inputted to the projector 1 through the remote control 4. Certainly, the present disclosure is not limited thereto, and the verification information may also be directly inputted to the projector 1 through a menu key. The verification information may be a set of string-type passwords or information such as a graphical trajectory. For example, the projector 1 requires the user to make the remote control 4 move according to a certain trajectory.

In order to improve the security of the method for authorized use of a projector according to the present disclosure, the license and the verification information exchanged between the projector 1 and the projector authorization server 3 can be encrypted and decrypted to improve the security and prevent surreptitious use of the projector 1 and economic losses to the lessor caused by tampering with intermediate data. Certainly, there are a variety of encryption and decryption methods, and Embodiment 1 below illustrates symmetric encryption and decryption of the verification information and asymmetric encryption and decryption of the license. Certainly, the present disclosure is not limited thereto, and the verification information may also be encrypted and decrypted by HASH function operation.

Embodiment 1

Figure 3:
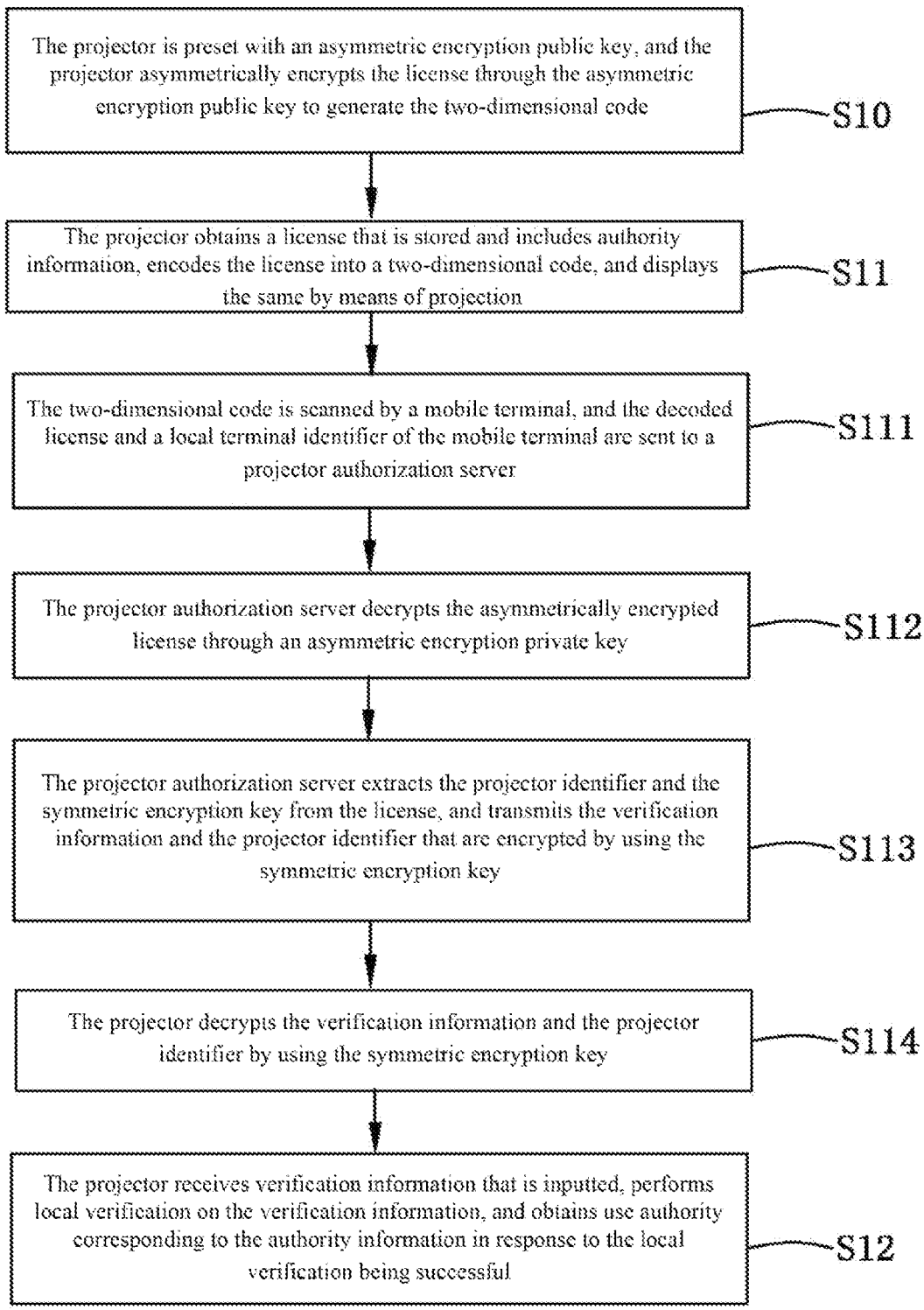
FIG. 3 is a flowchart diagram of Embodiment 1 of a method for authorized use of a projector according to the present disclosure.

Referring to FIG. 3, which is a flowchart diagram of Embodiment 1 of a method for authorized use of a projector according to the present disclosure. The present disclosure provides a method for authorized use of a projector, based on a projector 1, the method for authorized use of a projector includes the following steps.

In step S10, the projector 1 is preset with an asymmetric encryption public key, and the projector 1 asymmetrically encrypts the license through the asymmetric encryption public key to generate the two-dimensional code. Two keys are needed for encryption and decryption in an asymmetric encryption algorithm. The two keys are a public key and a private key. The asymmetric encryption method is beneficial for the lessor to improve the security of the license, especially key information of the authorized time included therein, through asymmetric encryption and prevent cheating. In addition, a same key, that is, the symmetric encryption key, is used for encryption and decryption in the symmetric encryption algorithm.

In step S11, the projector 1 obtains a license that is stored and includes authorization information, encodes the license into a two-dimensional code, and displays the same by means of projection.

In step S111, the two-dimensional code is scanned by a mobile terminal 2, and the decoded license and a local terminal identifier of the mobile terminal 2 are sent to a projector authorization server 3.

In step S112, the projector authorization server 3 decrypts the asymmetrically encrypted license through an asymmetric encryption private key. The projector authorization server 3 is preset with the asymmetric encryption private key matching the asymmetric encryption public key.

In step S113, the projector authorization server 3 extracts the projector identifier and the symmetric encryption key from the license, and transmits the verification information and the projector identifier that are encrypted by using the symmetric encryption key. The license further includes a projector identifier and a symmetric encryption key that is randomly generated.

In step S114, the projector 1 decrypts the verification information and the projector identifier by using the symmetric encryption key. In this implementation, the projector 1 decrypts the verification information by using the symmetric encryption key and decrypts the verification information and the projector identifier, and the verification information is separated from the projector identifier through the projector 1.

In step S12, the projector 1 receives verification information that is inputted, performs local verification on the verification information, and obtains use authorization corresponding to the authorization information in response to the local verification being successful. The step of performing local verification on the verification information includes: obtaining a local projector identifier; comparing the decrypted verification information with verification information stored in the projector 1 in response to the decrypted projector identifier being consistent with the local projector identifier; and determining that the local verification is successful in response to the decrypted verification information being consistent with the verification information stored in the projector, or determining that the local verification fails in response to the decrypted verification information being not consistent with the verification information stored in the projector.

Figure 4:
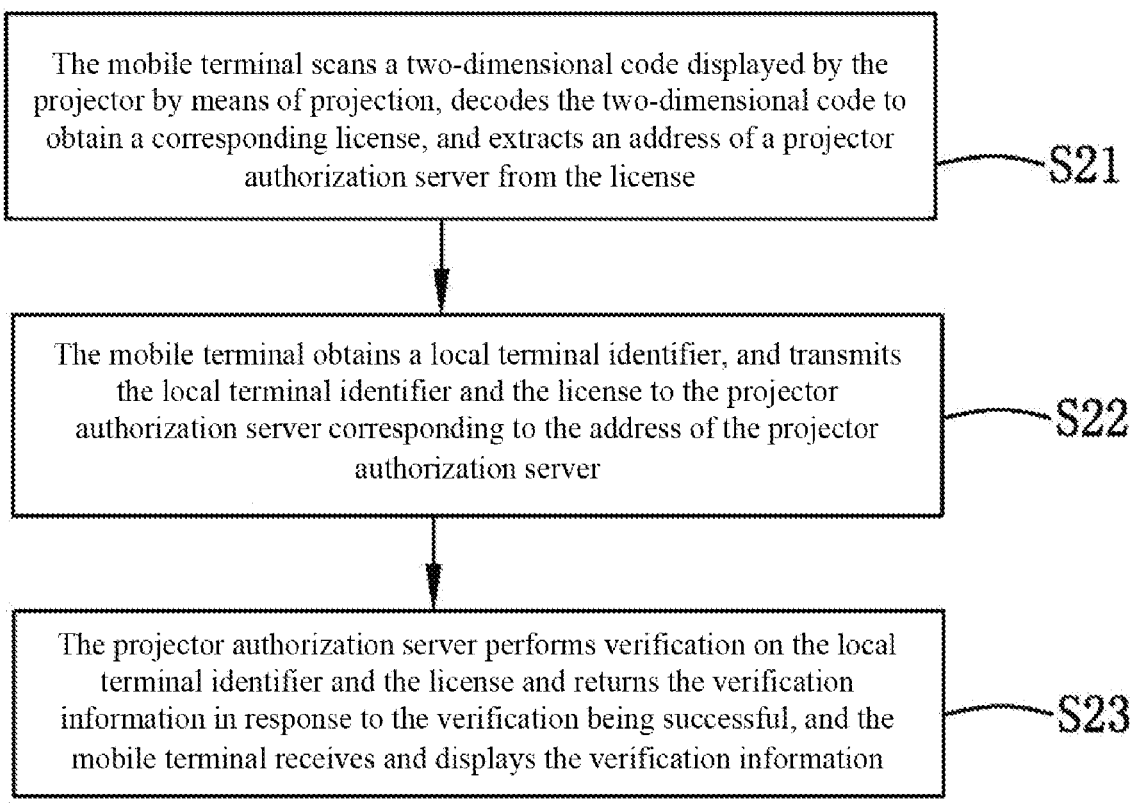
FIG. 4 is a flowchart diagram of another method for authorized use of a projector according to the present disclosure.

Referring to FIG. 4, the present disclosure further provides another method for authorized use of a projector, based on a mobile terminal 2, the method for authorized use of a projector includes the following steps.

In step S21, the mobile terminal 2 scans a two-dimensional code displayed by the projector 1 by means of projection, decodes the two-dimensional code to obtain a corresponding license, and extracts an address of a projector authorization server from the license. The license includes the authorization information. The authorization information includes at least one of authorized use duration, a lease use time period, or geographic location information. The authorization information of the projector 1 includes a lease use time period and geographic location information. For example, different charging standards are adopted for different regions, and lengths of time, whether the current time is within a monthly period, geographical location, etc., these information can be used as reference factors for determining whether the user is authorized to use the authorization information of the projector. In this implementation, the authorization information of the projector 1 includes authorized use duration. That is, the projector 1 may update authorized time in the lease license according to usage, that is, update use time. For a specific application scenario of device lease, management of the authorized time is a key point, which enables the device lease to be accurate to specific use time, and it may not cost lease time if the device is placed in situ and not turned on. Therefore, the problem involving fine lease management in the lease process is solved, making it beneficial for the lessor to expand the lease market.

The license further includes the projector identifier. The projector authorization server 3 performs verification on the license by determining whether the authorization information in a current license received by the projector authorization server 3 is within an authorization range stored in the projector authorization server 3.

In step S22, the mobile terminal 2 obtains a local terminal identifier, and transmits the local terminal identifier and the license to the projector authorization server 3 corresponding to the address of the projector authorization server. The license is configured to be verified by the projector authorization server 3, and the license includes authorization information and the address of the projector authorization server.

In step S23, the projector authorization server 3 performs verification on the local terminal identifier and the license and returns the verification information in response to the verification being successful, and the mobile terminal 2 receives and displays the verification information. The verification information is inputted to the projector 1, and the projector 1 performs local verification on the verification information and obtains use authorization corresponding to the authorization information in response to the local verification being successful. The projector authorization server 3 performs verification on the license by determining whether the authorization information in a current license received by the projector authorization server 3 is within an authorization range.

In order to improve the security of the method for authorized use of a projector according to the present disclosure, the license and the verification information exchanged between the projector 1 and the projector authorization server 3 can be encrypted and decrypted to improve the security and prevent surreptitious use of the projector 1 and economic losses to the lessor caused by tampering with intermediate data. Certainly, there are a variety of encryption and decryption methods. Embodiment 2 illustrates symmetric encryption and decryption of the verification information and asymmetric encryption and decryption of the license. Certainly, the present disclosure is not limited thereto, and the verification information may also be encrypted and decrypted by HASH function operation.

Embodiment 2

Figure 5:
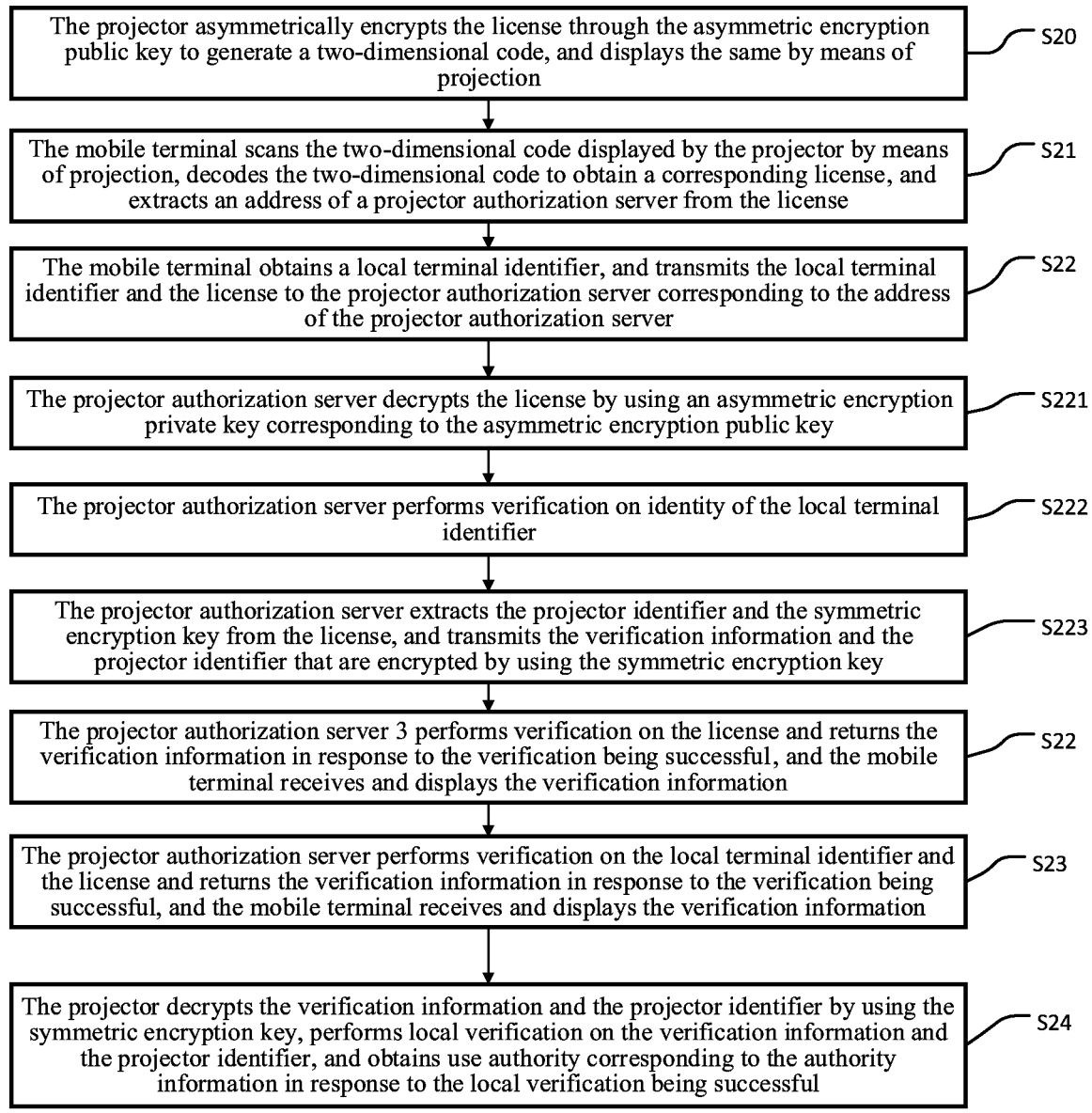
FIG. 5 is a flowchart diagram of Embodiment 2 of another method for authorized use of a projector according to the present disclosure.

Referring to FIG. 5, which is a flowchart diagram of Embodiment 3 of another method for authorized use of a projector according to the present disclosure. The present disclosure further provides another method for authorized use of a projector, based on a mobile terminal 2, the method includes the following steps.

In step S20, the projector 1 asymmetrically encrypts the license through the asymmetric encryption public key to generate a two-dimensional code, and displays the same by means of projection. The projector 1 is preset with the asymmetric encryption public key.

In step S21, the mobile terminal 2 scans the two-dimensional code displayed by the projector 1 by means of projection, decodes the two-dimensional code to obtain a corresponding license, and extracts an address of a projector authorization server from the license. The license includes the authorization information. The authorization information includes at least one of authorized use duration, a lease use time period, or geographic location information. The authorization information of the projector 1 includes a lease use time period and geographic location information.

In step S22, the mobile terminal 2 obtains a local terminal identifier, and transmits the local terminal identifier and the license to the projector authorization server 3 corresponding to the address of the projector authorization server. The license is configured to be verified by the projector authorization server 3, and the license includes authorization information and the address of the projector authorization server. The local terminal identifier corresponds to the license.

In step S221, the projector authorization server 3 decrypts the license by using an asymmetric encryption private key corresponding to the asymmetric encryption public key.

In step S222, the projector authorization server 3 performs verification on identity of the local terminal identifier, and in response to the verification being successful, performs verification on the license corresponding to the local terminal identifier. In this implementation, the mobile terminal 2 is a smart phone, and the local terminal identifier is a mobile phone number.

In step S223, the projector authorization server 3 extracts the projector identifier and the symmetric encryption key from the license, and transmits the verification information and the projector identifier that are encrypted by using the symmetric encryption key. The license further includes a projector identifier and a symmetric encryption key that is randomly generated.

In step S23, the projector authorization server 3 performs verification on the local terminal identifier and the license and returns the verification information in response to the verification being successful, and the mobile terminal 2 receives and displays the verification information. The verification information is inputted to the projector 1, and the projector 1 performs local verification on the verification information and obtains use authorization corresponding to the authorization information in response to the local verification being successful. The projector authorization server 3 performs verification on the license by determining whether the authorization information in a current license received by the projector authorization server 3 is within an authorization range.

In step S24, the projector 1 decrypts the verification information and the projector identifier by using the symmetric encryption key, performs local verification on the verification information and the projector identifier, and obtains use authorization corresponding to the authorization information in response to the local verification being successful.

The step of performing local verification on the verification information includes: obtaining a local projector identifier; comparing the decrypted verification information with verification information stored in the projector 1 in response to the decrypted projector identifier being consistent with the local projector identifier; and determining that the local verification is successful in response to the decrypted verification information being consistent with the verification information stored in the projector, or that the local verification fails in response to the decrypted verification information being not consistent with the verification information stored in the projector.

In this implementation, the step of receiving, by the projector 1, verification information that is inputted includes: receiving verification information that is inputted by a remote control 4. The verification information is inputted to the projector 1 through the remote control 4. Certainly, the present disclosure is not limited thereto, and the verification information may also be directly inputted to the projector 1 through a menu key. The verification information may be a set of string-type passwords or information such as a graphical trajectory. For example, the projector 1 requires the user to make the remote control 4 move according to a certain trajectory.

Compared with the related art, in the method for authorized use of a projector according to the present disclosure, a projector encodes a license into a two-dimensional code and displays the same by means of projection; a mobile terminal identifies the two-dimensional code to obtain the license and transmits the license and a local terminal identifier of the mobile terminal to a projector authorization server; the projector authorization server performs verification on the local terminal identifier and the license, generates verification information in response to the verification being successful, and transmits the verification information to the mobile terminal; the mobile terminal receives and displays the verification information; the projector receives verification information that is inputted, performs local verification on the verification information, and obtains use authorization corresponding to the authorization information in response to the local verification being successful. Through the above step operations, the projector is not required to be connected to the Internet, the authorization information is projected and displayed in a form of a two-dimensional code by the projector, the mobile terminal scans the code and is connected to data of the server, and the projector authorization server realizes authorization management, so as to realize management and authorization of the license on a lease market without connecting the projector to the Internet. The projector asymmetrically encrypts the license including authorization information, encodes the license into a two-dimensional code, and displays the same by means of projection. The mobile terminal identifies the two-dimensional code to obtain the encrypted license and transmits the encrypted license to the projector authorization server. The projector authorization server decrypts the asymmetrically encrypted license by using the asymmetric encryption private key. On the other hand, the projector authorization server performs verification on the license and generates verification information in response to the verification being successful. The projector authorization server asymmetrically encrypts the verification information by using the received symmetric encryption key and then transmits the encrypted verification information to the mobile terminal. The mobile terminal receives and displays the encrypted verification information. The projector asymmetrically decrypts inputted encrypted verification information by using the symmetric encryption key, performs local verification on the decrypted verification information, and obtains use authorization corresponding to the authorization information in response to the local verification being successful. In the above process, the license is encrypted and decrypted by using asymmetric encryption, and the verification information is encrypted and decrypted by using symmetric encryption, so that authorization management of the projector in a lease process, such as the authorization management of authorized time, is more secure, so as to prevent modification on the authorized time by the lease user, thereby effectively improving the security of the method for authorized use of a projector.

It should be noted that, the above embodiments described with reference to the accompany drawings are merely intended to illustrate the present disclosure instead of limiting the scope of the present disclosure. Those of ordinary skill in the art should understand that modifications or equivalent replacements made to the present disclosure without departing from the spirit and scope of the present disclosure shall fall within the scope of the present disclosure. In addition, unless otherwise indicated in the context, any term in the singular form applies to the plural form, and vice versa. Besides, unless otherwise stated, the whole or a part of any embodiment can be used in combination with the whole or a part of any other embodiments.

The invention claimed is:

1. A method for authorized use of a projector, the method comprising:
   obtaining a license comprising authorization information stored on the projector;
   encoding the license into a quick response (QR) code and displaying the QR code by means of projection, wherein the QR code is scanned and identified by a mobile terminal, the mobile terminal is configured to identify the QR code to obtain the license, transmit the license and a local terminal identifier of the mobile terminal to a projector authorization server, and receive verification information generated by the projector authorization server in response to verification by the projector authorization server on the license and the local terminal identifier being successful; and
   receiving the verification information, performing local verification on the verification information, and obtaining use authorization corresponding to the authorization information in response to the local verification being successful.

2. The method according to claim 1, wherein the authorization information comprises at least one of authorized use duration, a lease use time period, or geographic location information.

3. The method according to claim 1, wherein prior to said encoding, by the projector, the license into the QR code and displaying the QR code by means of projection, the projector is preset with an asymmetric encryption public key, and the projector asymmetrically encrypt the license through the asymmetric encryption public key to generate the QR code.

4. The method according to claim 3, wherein the projector authorization server is preset with an asymmetric encryption private key matching the asymmetric encryption public key, and the projector authorization server is configured to decrypt the asymmetrically encrypted license through the asymmetric encryption private key.

5. The method according to claim 1, wherein the license further comprises a projector identifier and a symmetric encryption key that is randomly generated, wherein the projector authorization server is further configured to extract the projector identifier and the symmetric encryption key from the license, and transmit the verification information and the projector identifier that have been encrypted by using the symmetric encryption key.

6. The method according to claim 5, comprising, prior to said performing local verification on the verification information:
   decrypting the verification information and the projector identifier by using the symmetric encryption key.

7. The method according to claim 6, wherein said performing local verification on the verification information comprises:
   obtaining a local projector identifier, comparing the decrypted verification information with verification information stored in the projector in response to the decrypted projector identifier being consistent with the local projector identifier, and determining that the local verification is successful in response to the decrypted verification information being consistent with the verification information stored in the projector.

8. The method according to claim 1, wherein said receiving the verification information that is inputted comprises:
   receiving the verification information that is inputted by a remote control.

9. A method for authorized use of a projector, the method comprising:
   scanning a quick response (QR) code that is displayed by the projector by means of projection, decoding the QR code to obtain a corresponding license, and extracting an address of a projector authorization server from the license;
   obtaining a local terminal identifier, and transmitting the local terminal identifier and the license to the projector authorization server corresponding to the address of the projector authorization server, wherein the projector authorization server performs verification on the license, and the license comprises authorization information and the address of the projector authorization server; and
   receiving verification information that is generated by the projector authorization server in response to verification by the projector authorization server on the local terminal identifier and the license being successful, wherein the verification information is inputted to the projector, and the projector performs local verification on the verification information and obtains use authorization corresponding to the authorization information in response to the local verification being successful.

10. The method according to claim 9, wherein the authorization information comprises at least one of authorized use duration, a lease use time period, or geographic location information.

11. The method according to claim 10, wherein the projector authorization server performs verification on the license by determining whether the authorization information in a current license received by the projector authorization server is within an authorization range.

12. The method according to claim 9, wherein the QR code is generated by the projector which asymmetrically encrypts the license by using an asymmetric encryption public key.

13. The method according to claim 12, wherein the projector authorization server is further configured to decrypt the license by using an asymmetric encryption private key corresponding to the asymmetric encryption public key.

14. The method according to claim 13, wherein the license further comprises a projector identifier and a symmetric encryption key that is randomly generated, wherein the projector authorization server is further configured to extract the projector identifier and the symmetric encryption key from the license, and transmit the verification information and the projector identifier that are encrypted by using the symmetric encryption key.

15. The method according to claim 9, wherein the verification information is inputted to the projector by a remote control.

16. The method according to claim 9, wherein the mobile terminal is a smart phone, and the local terminal identifier is a mobile phone number.

* * * * *